United States Patent [19]

Haarstad et al.

[11] Patent Number: 4,496,460

[45] Date of Patent: Jan. 29, 1985

[54] SECONDARY FLOW FLUID FILTER

[75] Inventors: Richard O. Haarstad, New Brighton; Jerry L. Kammerer, Plymouth, both of Minn.

[73] Assignee: Hydraulic Specialty Company, Minneapolis, Minn.

[21] Appl. No.: 522,349

[22] Filed: Aug. 11, 1983

[51] Int. Cl.³ .............................................. B01B 29/36
[52] U.S. Cl. .................................... 210/132; 210/137; 210/168
[58] Field of Search ............... 210/132, 133, 130, 136, 210/168, 137

[56] References Cited

U.S. PATENT DOCUMENTS

| | | | |
|---|---|---|---|
| 2,071,483 | 2/1937 | Winslow | 210/133 |
| 2,076,936 | 4/1937 | Burckhalter | 210/133 |
| 2,423,329 | 7/1947 | Le Clair | 210/133 |
| 2,602,547 | 7/1952 | Floss et al. | 210/133 |
| 4,033,870 | 7/1977 | Parquet et al. | 210/132 X |

Primary Examiner—John Adee
Attorney, Agent, or Firm—Merchant, Gould, Smith, Edell, Welter & Schmidt

[57] ABSTRACT

The present invention is directed to secondary filtration apparatus used in combination with a full flow filter of the type commonly used in series with a use device. The secondary filter system includes within a base an orifice for limiting fluid flow and a pressure reducing and relieving device for maintaining a pressure level to the secondary filter thereby allowing use of a filter element of much smaller porosity than the full flow filter element. Much greater cleansing of the fluid is achieved thereby increasing the lifetime of the use device and reducing maintenance costs.

7 Claims, 4 Drawing Figures

SECONDARY FLOW FLUID FILTER

TECHNICAL FIELD

This invention relates to the field of fluid filtration, and, more particularly, to a mechanism providing for regulated fluid flow through a secondary filter in a filtration circuit.

BACKGROUND OF THE INVENTION

The cleansing of oil and other fluids with respect to an engine or other device with filters having fillers made from a cellulistic or other material is well known. Generally, a fluid pump is driven to pump fluid from a reservoir through a filter and a use device before returning the fluid to the reservoir. The circulation network has all elements in series allowing the full flow of the fluid to pass through the filter. Although such filtration networks are widely used, the cleansing efficiency of a full flow filter system is less than desirable. On the pressurized side of a use device, a full flow filter cannot impede flow and, consequently, its porosity must be quite large. Normally, such filters are not capable of removing contaminants smaller than 10–15 microns. Unfortunately, many harmful contaminants are in the 2–5 micron range. On the return side of the use device, flow rate is not as crucial, but for most use devices, for example, vehicle engines, return side location precludes use of a standard fliter. Thus, it is presently quite common to change oil, transmission fluid, and other fluids frequently in the various use systems.

SUMMARY OF THE INVENTION

The present invention is directed to a parallel filtration branch in a fluid circulation circuit which includes a power driven pump for forcing fluid through a full flow filter to a use device. A parallel branch includes a second filter and a base mechanism for holding the second filter. The base mechanism includes a pressure reducing device for reducing fluid pressure from the high pressure created by the pump. The base mechanism further includes a mechanism for limiting fluid flow rate to the second filter. Also, the parallel branch includes mechanism for communicating fluid from the high pressure line in the primary circuit to the base mechanism and mechanism for communicating fluid from the base mechanism to the reservoir.

The base for the second filter advantageously includes an enclosure within which the pressure reducing device is contained. Since the pressure reducing device includes a mechanism for adjusting the reduced pressure level, such enclosure advantageously protects the adjustment mechanism from inadvertent alteration. Furthermore, a single base assembly has the further advantage of reducing the chance of leakage and making the assembly simpler and easier to install on a wide variety of equipment.

The secondary filtration system of the present invention for use in a full flow fluid filter circuit provides for significantly better filtration resulting in extended life for the use device and much reduced maintenance cost. The pressure reduction of the present combination allows for the use of super fine filter filler media so that not only are contaminants as small as one micron removed from the fluid, but also water may be removed. Additionally, the use of low pressure components reduces the likelihood of leakage and substantially reduces system cost.

Thus, a filtration circuit having the combination of elements in accordance with the present invention provides extended life and reduced maintenance possibilities for fluid use equipment not heretofore possible. These advantages and other objects obtained with this invention may be better understood by reference to the drawing and the detailed description relative thereto which follows hereinafter and wherein a preferred embodiment is described in detail.

DETAILED DESCRIPTION OF THE PREFERRED EMBODIMENT

Figure 4:
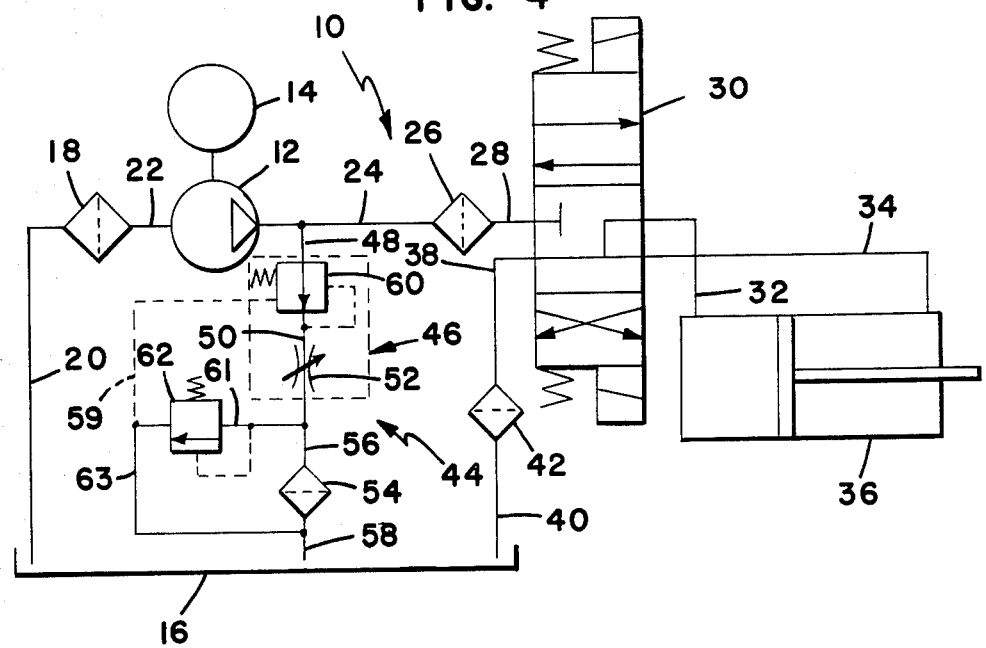
FIG. 4 is a schematic illustration of a filtration circuit having a secondary fluid filter branch in accordance with the present invention.

Referring now to the drawings wherein like reference numerals designate identical or corresponding parts throughout the several views, and more particularly to FIG. 4, a filtration circuit having a branch in accordance with the present invention is designated generally as 10. In circuit 10, fluid is drawn by pump 12 driven by motor 14 from reservoir 16 through a straining filter 18. Hydraulic line 20 connects reservoir 16 to straining filter 18, while line 22 connects filter 18 to pump 12. Fluid is forced from pump 12 through hydraulic line 24 to full flow filter 26. From filter 26, fluid flows to a use device. In circuit 10, fluid is shown as flowing from filter 26 through line 28 to a three position, solenoid controlled, reversing valve 30 having spring returns. Hydraulic lines 32 and 34 connect valve 30 with a cylinder and piston assembly 36. Fluid is returned from assembly 36 through valve 30 to reservoir 16 through hydraulic lines 38 and 40 and return filter 42.

A secondary filtration branch 44 of circuit 10 is shown to provide an alternate path for fluid to reservoir 16. A portion of the fluid in high pressure hydraulic line 24 may flow to pressure reducing device 46 through line 48. Device 46 includes a valve 60 and a restriction 52. Valve 60 is connected within device 46 to restriction 52. The connection is shown as line 50 in FIG. 4. Valve 60 is normally open and functions against an adjustable bias to maintain a desired low pressure flow through restriction 52. Restriction 52 regulates the amount of fluid flow to secondary filter 54. Restriction 52 may be adjustable as shown. Fluid flows from restriction 52 through filter 54 to reservoir 16 via lines 56 and 58. A relief valve 62, although not necessary, is added protection for filter 54 and is connected across filter 54 with lines 61 and 63.

Figure 1:
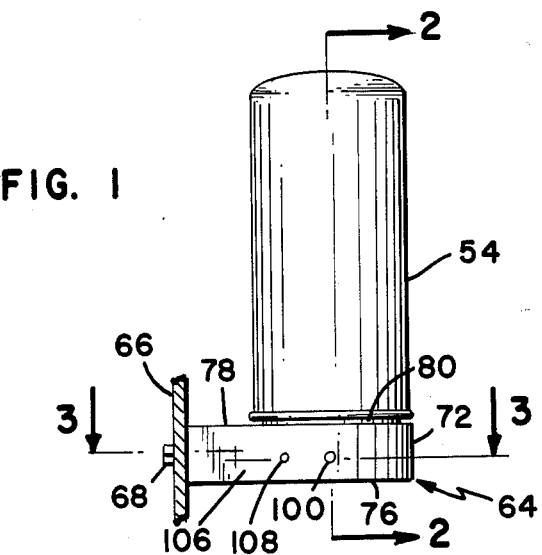
FIG. 1 is an elevational view of a base and filter as attached to a structural wall in accordance with the present invention.

Much of branch 44, including filter 54 and device 46, is attachable to a base 64 (see FIG. 1) in accordance with the present invention. Base 64 conveniently attaches to a wall 66 with bolts 68 as discussed further hereinbelow or with other brackets and fastening devices.

Figure 2:
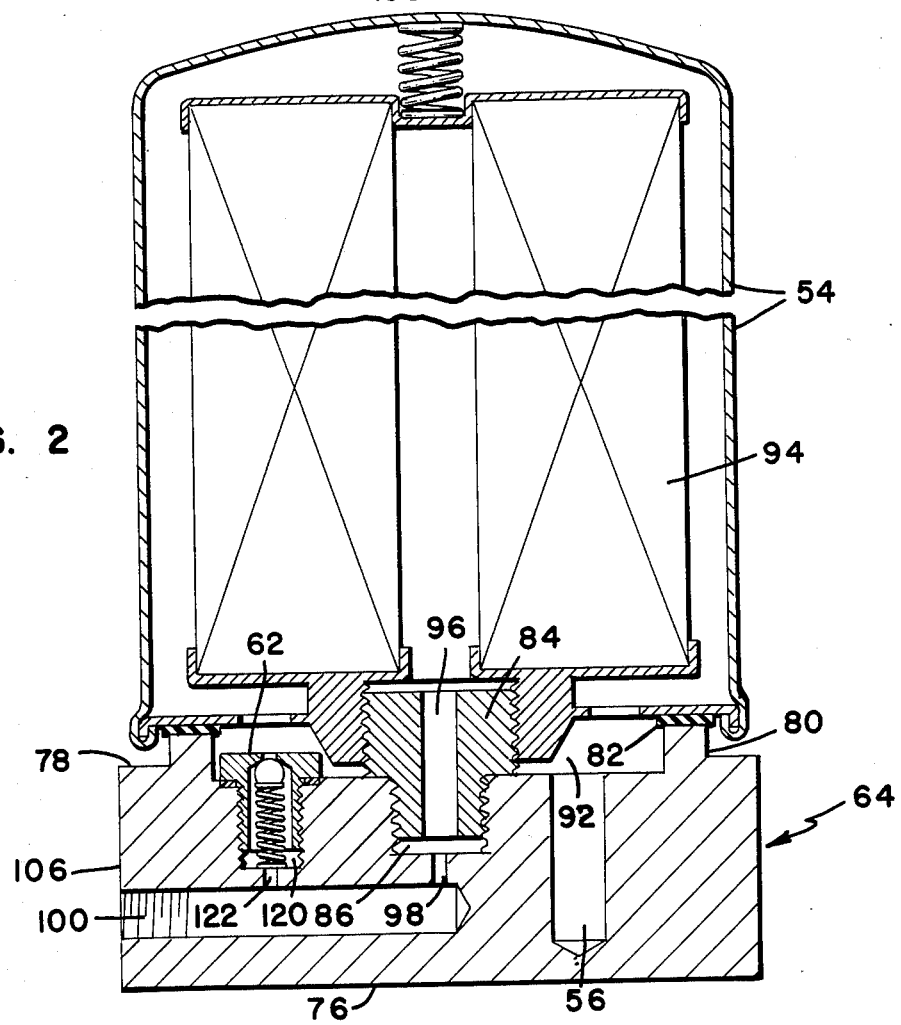
FIG. 2 is a cross-sectional view taken along line 2—2 of FIG. 1.
Figure 3:
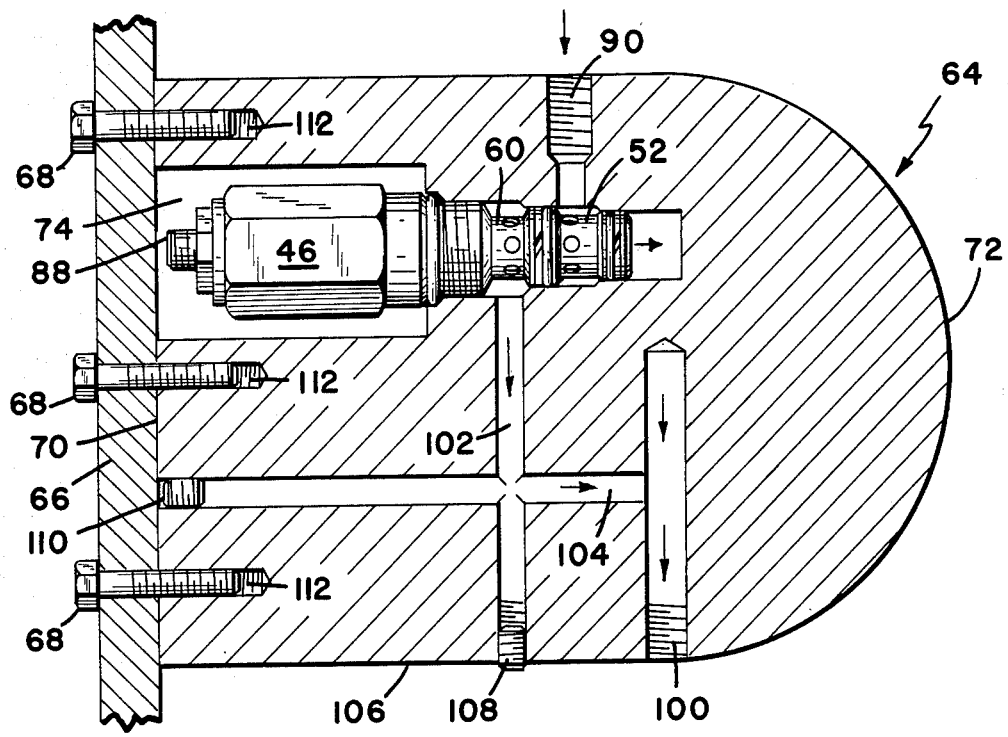
FIG. 3 is a cross-sectional view taken along line 3—3 of FIG. 1.

As shown in FIGS. 2 and 3, base 64 is made from a solid material, such as aluminum or some other metal. It may, however, be made from any solid material which does not react with the fluid of the system. It is noted also that base 64 may be cast. Base 64 has a squared end 70 for butting against wall 66. Normally, its other end is semicircular to conform with the shape of a common filter. Base 64 has sufficient thickness to provide for cavity 74 which receives pressure reducing device 46 and for various passages described hereinafter. The bottom side 76 of base 64 may be flat. The top side 78, as shown in FIG. 2, has a circular wall 80 rising upwardly therefrom to provide a sealing surface for gasket 82 of filter 54. Top side 78 may also have other configurations as required to mate with a filter 54. Centered within wall 80 is a threaded connector 84 received at its lower end by a threaded opening 86. Connector 84 provides a stud mounting on which filter 54 may be screwed to fasten against wall 80.

Cavity 74 is shaped as required to receive a commercially available pressure reducing device 46. A typical device may be obtained from Modular Controls, Box 36, Villa Park, Ill. 60161, by specifying part number PRVI-10-S-0-2. Device 46 includes an adjusting mechanism 88 at one end for appropriately adjusting valve 60. As shown in FIGS. 2 and 3, base 64 has an inlet port 90 which communicates with restriction portion 52 of device 46. Fluid flows through restriction portion 52 to a vertical passage 56 which empties into the ring of space 92 between wall 80 and connector 84 for subsequent entry into filter 54. Passage 56 is a flow limiting orifice for secondary circuit branch 10. Fluid flows through filter 54 in the usual fashion from the outside of filter element 94 to the inside for passage through a central opening 96 in connector 84 to cavity 86 and a short vertical passage 98 before emptying into passage 100 leading to an outlet end for connection to hydraulic line 58 leading to reservoir 16.

Fluid flowing to restriction portion 52 at the same time flows to and provides pressure against relief valve 60. When a pressure level is reached which causes valve 60 to open, fluid flows through valve 60 and orthogonally oriented passages 102 and 104 to outlet passage 100. For ease of manufacture, passage 102 is bored from a side 106 of base 64 in line with valve 60. A plug 108 provides a stop at the end of passage 102 near edge 106. Similarly, passage 104 is drilled from end 70 to intersect passage 102 and outlet passage 100. Plug 110 stops the end of passage 104 near end 70.

Base 64 also includes cavity 120 having a threaded wall for receiving relief valve 62. Cavity 120 is formed in the top side 78 of base 64 so that a passage 122 in the end of cavity 120 communicates with outlet passage 100. Relief valve 62 protects filter element 94 in case dirt or other particulate matter causes pressure reducing device 46 to hang open thereby exposing element 94 to high pressure fluid.

Plug 110 and pressure reducing device 46 are inserted sufficiently within the respective openings so that end 70 may butt flush against wall 66. Bolts 68 pass through wall 66 into threaded openings 112 in the end 70 of base 64.

In use, pressure reducing device 46 is adjusted as desired at 88. Base 64 is fastened to wall 66 with bolts 68. Filter 54 is screwed onto connector 84 to provide a seal between gasket 82 and wall 80. Hydraulic lines are connected to inlet port 90 and the outlet end of passage 100 in accordance with branch 44 of circuit 10. When the use device 36 is actuated so that motor 14 and pump 12 are likewise actuated to draw fluid from reservoir 16 to straining filter 18 and force it through full flow filter 26 and valve 30 to use device 36 for return through straining filter 42 to reservoir 16, fluid fills line 48 and inlet port 90 as a result of connection to high pressure line 24. This secondary flow is regulated by passage 56 for flow through secondary filter 54 to passage 100 for return to reservoir 16. Valve 60 relieves the pressure from several thousand pounds per square inch to less than a hundred pounds per square inch and is also in fluid communication with reservoir 16 through passages 102, 104 and 100.

Thus, circuit 10 having branch 44 not only provides for full flow filtration to remove contaminants down to 10–15 microns, but also provides a continuous partial cleansing of secondary flow through secondary filter 54 to remove contaminants down to one micron. Secondary filter 54 may have a much finer porosity than primary full flow filter 26 since fluid flow through it is regulated in both quantity and pressure. This added cleansing results in longer lifetime of system parts, less frequency fluid changes, and reduced maintenance costs. Base 64 advantageously encloses pressure reducing device 46 thereby virtually eliminating inadvertent adjustment changes in device 46 and vastly reducing leakage problems. Furthermore, base 46 provides a medium within which various passages may be formed for the proper functioning of device 46 and filter 54.

In accordance with the present invention, a regulated flow secondary filter branch 44 is easily added to existing filtration systems simply by providing a T-connection into a high pressure line and providing a return line to reservoir. Base 64 is readily attached to a convenient wall 66.

Thus, numerous characteristics and advantages of a fluid circuit 10 having a regulated flow secondary filter branch 44, as well as a device comprised of a base 64 for a secondary filter 54, have been set forth in the foregoing description. Where appropriate, details of structure and function have been discussed. It is to be understood, however, that the embodiment described is illustrative only. Consequently, changes made, especially in matters of shape, size and arrangement, to the full extent extended by the general meaning of the terms in which the appended claims are expressed, are understood to be within the principle of the present invention.

What is claimed is:

1. In a fluid circulation circuit including a power-driven pump for creating high pressure flow from a reservoir through a full flow first filter and a fluid use device for return to said reservoir, a combination comprising:

a second filter;

base means for holding said second filter, said base means including a pressure reducing device upstream from said second filter, said device reducing fluid pressure from the high pressure of a high pressure line in said circuit, said base means further including means for limiting fluid flow rate to said second filter;

first means for communicating a portion of the fluid flowing in said high pressure line to said base means; and second means for communicating fluid from said base means downstream from said second filter to said reservoir;

whereby said second filter continuously filters a portion of flowing fluid, said second filter being exposed through said pressure reducing device to controlled inlet pressure less than the working high pressure to said first filter and through said limiting means to predetermined flow rates of fluid so that said second filter may filter smaller contaminants than said first filter.

2. The combination in accordance with claim 1 wherein said pressure reducing device includes means for adjusting a reduced pressure level, said base means including means for enclosing said pressure reducing device to prevent inadvertent alteration of said adjusting means.

3. The combination in accordance with claim 1 wherein said flow rate limiting means includes an orifice between said pressure reducing device and said second filter.

4. The combination in accordance with claim 1 wherein said base means includes a relief valve interposed in a fluid communication path between input and output sides of said second filter.

5. Fluid apparatus, comprising:
a filter element;
a pressure reducing device;
a base for said filter element including means for attaching said filter element thereto, said base including an enclosed space for receiving said pressure reducing device and means for attaching said device within said space to said base, said base further including means for receiving fluid from a high pressure source and directing said fluid to said device, said base also including first means for directing fluid from said device to said filter element and second means for directing fluid from said filter element and said device to an output port.

6. Apparatus in accordance with claim 5 wherein said first fluid directing means includes an orifice for limiting fluid flow to said filter element.

7. Apparatus in accordance with claim 6 including a relief valve attached within said base and connected in a fluid communication path between said first and second fluid directing means.

* * * * *